US008644573B2

(12) United States Patent
Riddell

(10) Patent No.: US 8,644,573 B2
(45) Date of Patent: Feb. 4, 2014

(54) TOMOGRAPHIC PROCESSING METHOD WITH A SMALL NUMBER OF PROJECTIONS OF A CONTRASTED OBJECT

(75) Inventor: Cyril Riddell, Issy-les-Moulineaux (FR)

(73) Assignee: General Electric Company, Schenectady, NY (US)

( * ) Notice: Subject to any disclaimer, the term of this patent is extended or adjusted under 35 U.S.C. 154(b) by 147 days.

(21) Appl. No.: 13/414,748

(22) Filed: Mar. 8, 2012

(65) Prior Publication Data

US 2012/0230569 A1 Sep. 13, 2012

(30) Foreign Application Priority Data

Mar. 8, 2011 (FR) ...................... 11 51887

(51) Int. Cl.
*G06K 9/00* (2006.01)

(52) U.S. Cl.
USPC ........................................... 382/130; 382/131

(58) Field of Classification Search
None
See application file for complete search history.

(56) References Cited

U.S. PATENT DOCUMENTS

| | | | | |
|---|---|---|---|---|
| 8,170,311 | B2 * | 5/2012 | Ying .............................. | 382/128 |
| 8,472,688 | B2 * | 6/2013 | Samsonov et al. ............ | 382/130 |
| 2005/0100202 | A1 * | 5/2005 | Huang .......................... | 382/128 |
| 2006/0104406 | A1 * | 5/2006 | Siltanen et al. .................. | 378/4 |
| 2009/0161933 | A1 * | 6/2009 | Chen ............................. | 382/131 |
| 2010/0207629 | A1 * | 8/2010 | Trzasko et al. ................ | 324/309 |
| 2010/0246920 | A1 * | 9/2010 | Vaswani ....................... | 382/131 |
| 2012/0008844 | A1 * | 1/2012 | Bilgin et al. .................. | 382/131 |
| 2013/0114872 | A1 * | 5/2013 | Chen et al. ................... | 382/131 |
| 2013/0121550 | A1 * | 5/2013 | Chang et al. ................. | 382/130 |

FOREIGN PATENT DOCUMENTS

WO 2008107816 A1 9/2008

OTHER PUBLICATIONS

Donoho, David L. "Compressed sensing." Information Theory, IEEE Transactions on 52.4 (2006): 1289-1306.*
Candès Emmanuel J., Justin Romberg, and Terence Tao. "Robust uncertainty principles: Exact signal reconstruction from highly incomplete frequency information." Information Theory, IEEE Transactions on 52.2 (2006): 489-509.*
A three-dimensional statistical approach to improved image quality for multislice helical CT. Thibault et al. Medical Physics, vol. 34. No. 11, Nov. 2007.
Frequency Weighted Least Squares Reconstruction of Truncated Transmission SPECT Data. Riddell et al. IEEE Transactions on Nuclear Science, vol. 43, No. 4, Aug. 1996.

(Continued)

*Primary Examiner* — Stephen R Koziol
*Assistant Examiner* — Sean Conner
(74) *Attorney, Agent, or Firm* — Global Patent Operation; Marc A. Vivenzio

(57) ABSTRACT

A method for processing a sequence of a plurality of projection images of an object of interest is provided. The method, being recursive, comprises defining, a priori, a sparse image and a series of models for breaking down the object as a sum of a sparse component and of a complementary non-sparse component; initializing a sparse image depending on the sparse image defined a priori and initializing the series of models for breaking down the object; reconstructing an image of the sparse component of the decomposition model of the object from acquired projection images and from the initialized sparse image; and updating the sparse image so that, during the iterations, the reconstruction of the image of the sparse component gradually reintroduces the complementary component into the sparse image, in order to obtain a complete image of the non-sparse object.

11 Claims, 4 Drawing Sheets

(56) References Cited

OTHER PUBLICATIONS

Fast Gradient-Based Algorithms for Constrained Total Variation Image Denoising and Deblurring Problems. Beck and Teboulle. IEEE Transactions on Image Processing, vol. 18, No. 11, Nov. 2009.

Fast Image Recovery Using Variable Splitting and Constrained Optimization. Alfonse et al. IEEE Transactions on Image Processing, vol. 19, No. 9, Sep. 2010.

Prior image constrained compressed sensing (PICCS): A method to accurately reconstruct dynamic CT images from highly undersampled projection data sets. Chen et al. Medical Physics, vol. 35. No. 2, Feb. 2008.

2D X-Ray Tomographic Reconstruction From Few Number of Projections and 3D Perspectives: Applications of Compressed Sensing Theory. Wang et al. Apr. 2009.

French Search Report from French Office Action dated Oct. 24, 2011.

\* cited by examiner

TOMOGRAPHIC PROCESSING METHOD WITH A SMALL NUMBER OF PROJECTIONS OF A CONTRASTED OBJECT

BACKGROUND OF THE INVENTION

1. Field of the Invention

Embodiments of the invention relate generally to tomographic reconstruction of an object and, more particularly, to medical imaging by tomographic reconstruction or tomosynthesis with a small number of projections ("few view tomography").

2. Description of Related Art

The acquisition of 1D or 2D projection images of an object and the tomographic reconstruction of an image having a greater dimension, either 2D or 3D, of this object are schematically illustrated in FIG. 1.

The reconstruction of an image by tomography consists of emitting X-rays 10 from a source towards the object 12, the X-rays are emitted according to different angulations $l \in \{1, \ldots, L\}$ which define the trajectory Tr of the source (commonly a rotation, also called "spin"). The 3D reconstruction of the object is described below.

After having crossed the object 12, the X-rays are detected by a detector 13 so as to form a set of 2D projections. There are as many acquired 2D projections as there are relevant angulations (i.e. L projections for the trajectory). The acquisition is applied by a detector 13 located facing the X-ray source 11, for example, a digital camera. It is possible to apply the acquisition with a fixed detector and a source, which is not necessarily positioned facing the source.

An application of tomography is the detection and characterization of a lesion in an organ, for example, a breast cancer tumour or stenosis in a vessel of a patient. The acquired 2D projections are used for reconstructing a 3D image of the object. This 3D object is more specifically a 3D mapping of X-ray attenuation coefficients of the crossed medium. It is by means of this mapping that the radiology practitioner interprets this image according to the observed contrast differences.

The commonly reconstructed 3D images (for example by an algorithm of the filtered back-projection family) are affected with striations (streaks) due to the finite sampling of the object of interest. Each reconstructed point of the object is the origin of a bundle of lower intensity streaks but proportional to the intensity of the object in the relevant point and to the width of the angular pitch for which no measurement is available. The streaks, therefore, disappear when the angular pitch tends toward zero, i.e. for a large number of projections covering at least 180°. When the number of projections is limited by the rate of the imaging apparatus or does not cover 180°, because certain angulations are not accessible, the image is altered by sub-sampling streaks.

An problem is that the object to be reconstructed may include strong contrast differences. Thus, the streaks issued from more intense structures may strongly degrade the less intense structures or the lower contrast differences.

This phenomenon is all the more significant in the medical field when the imaged objects are organs crossed by a contrast product. This is also the case when the imaged object is a breast in which microcalcifications are found.

BRIEF SUMMARY OF THE INVENTION

With the embodiments of the invention it is possible to reconstruct an object by tomography with a small number of projections, notably when the object to be reconstructed includes significant contrast differences.

According to an embodiment of the present invention a method for processing a sequence of a plurality of 1D or 2D projection images of an object of interest is provided. The projection images of the object of interest are acquired by a medical imaging system comprising a source of rays, the source being configured to move around the object in order to acquire the plurality of 1D or 2D projection images of the object of interest according to a plurality of angulations, the number of 1D or 2D projections and/or the angular coverage leading to the occurrence of specific sub-sampling artefacts. The method, being recursive, comprises defining, a priori, a sparse image and a series of models for breaking down the object of interest as a sum of a sparse component and of a complementary non-sparse component; initializing a sparse 2D or 3D image depending on the sparse image defined a priori and initializing the series of models for breaking down the object of interest; reconstructing a 2D or 3D image of the sparse component of the decomposition model of the object of interest from acquired 1D or 2D projection images and from the initialized sparse 2D or 3D image; and updating the sparse 2D or 3D image as being equal to the reconstruction of the 2D or 3D image of the sparse component and updating the decomposition model of the object of interest into a new sparse component and a new complementary non-sparse component, and returning to reconstruction of the 2D or 3D image of the sparse component so that, during the iterations, the reconstruction of the 2D or 3D image of the sparse component gradually reintroduces the complementary component into the sparse 2D or 3D image, in order to obtain a complete 2D or 3D image of the non-sparse object of interest.

According to another embodiment of the present invention, a medical imaging system is provided. The medical imaging system comprises an acquisition unit configured to acquire a plurality of 1D/2D projection images of an object of interest, the acquisition unit comprising a source of radiation and a sensor, and a processing unit configured to: define, a priori, a sparse image and a series of models for breaking down the object of interest as a sum of a sparse component and of a complementary non-sparse component; initialize a sparse 2D or 3D image depending on the sparse image defined a priori and initializing the series of models for breaking down the object of interest; reconstruct a 2D or 3D image of the sparse component of the decomposition model of the object of interest from acquired 1D or 2D projection images and from the initialized sparse 2D or 3D image; and update the sparse 2D or 3D image as being equal to the reconstruction of the 2D or 3D image of the sparse component and updating the decomposition model of the object of interest into a new sparse component and a new complementary non-sparse component, and returning to reconstruction of the 2D or 3D image of the sparse component so that, during the iterations, the reconstruction of the 2D or 3D image of the sparse component gradually reintroduces the complementary component into the sparse 2D or 3D image, in order to obtain a complete 2D or 3D image of the non-sparse object of interest.

BRIEF DESCRIPTION OF THE SEVERAL VIEWS OF THE DRAWINGS

Other characteristics and advantages of embodiments of the invention will become further apparent from the description which follows, which is purely illustrative and non-limiting and should be read with reference to the appended drawings, wherein.

DETAILED DESCRIPTION OF THE INVENTION

Figure 1:
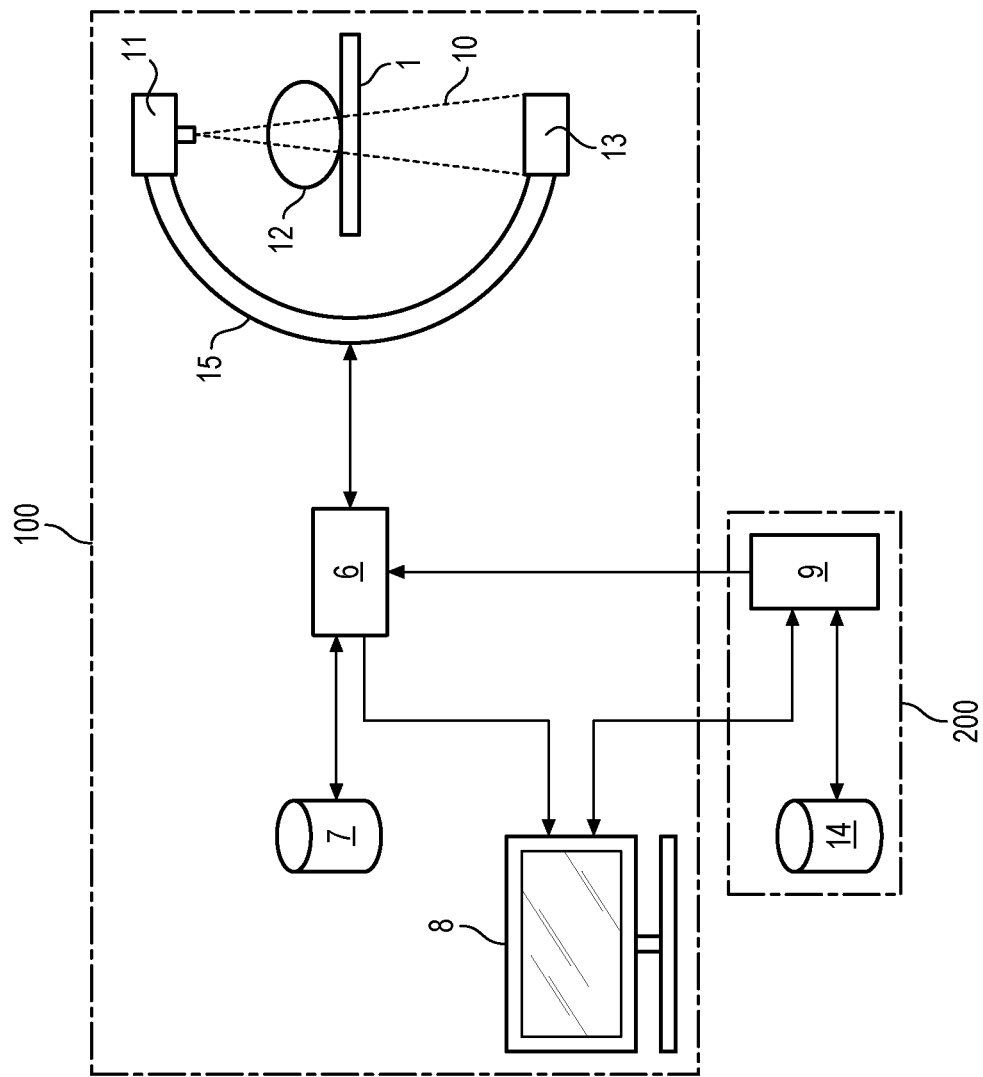
FIG. 1 illustrates a medical imaging system according to an embodiment of the invention.
Figure 2:
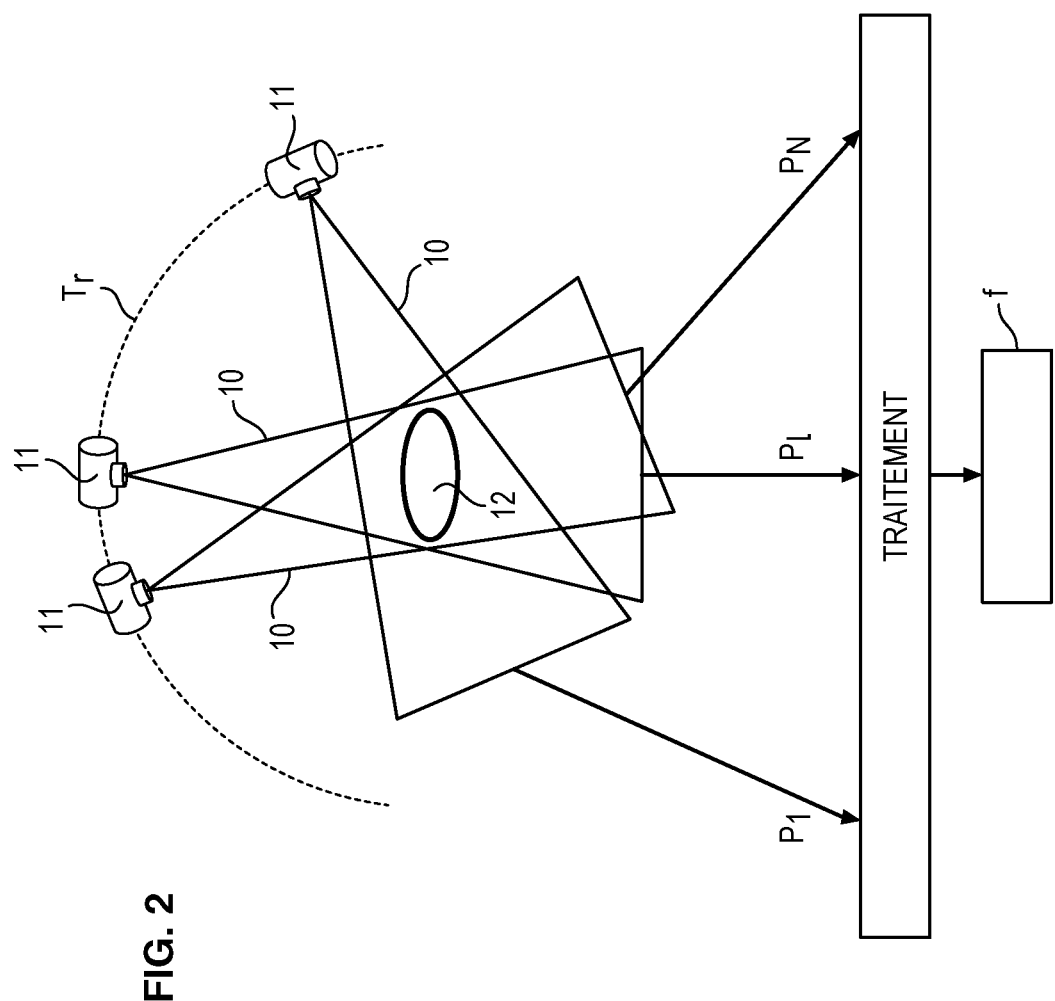
FIG. 2 illustrates a medical imaging system according to an embodiment of the invention.
Figure 3:
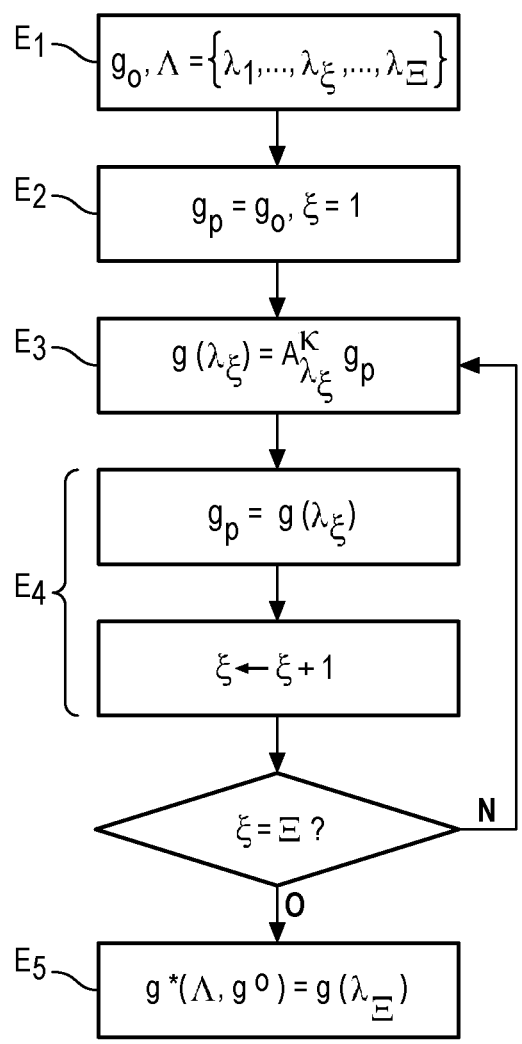
FIG. 3 illustrates an image processing method according to an embodiment of the invention.
Figure 4:
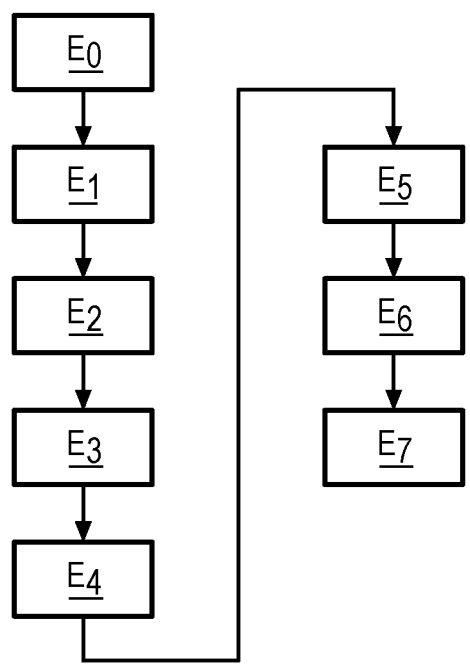
FIG. 4 illustrates steps of the image processing method according to an embodiment of the invention.

In FIG. 1, a medical imaging system for acquiring 2D projection images is schematically illustrated, for reconstructing a 3D image of an organ. Such a system is notably used for detecting and characterizing stenoses in vessels.

The medical imaging system 100 comprises a support 1, intended to receive a patient 12 to be examined, a source 11 intended to emit a beam 10 of X-rays, a detector 13 positioned facing the source 11, and configured for detecting the X-rays emitted by the source 11, a control unit 6, a storage unit 7, and a display unit 8.

Ionizing radiations other than X-rays may be contemplated: notably gamma rays. Thus, the tomographic devices used in nuclear medicine (single photon emission and transmission tomography and positron emission tomography) are compliant with embodiments of the invention.

The X-ray source 11 and the detector 13 are, for example, connected by means of a arm 15.

The detector 13 may be a semiconducting image sensor for example, comprising a cesium iodide phosphor (scintillator) on a transistor/photodiode array in amorphous silicon. Other adequate detectors are: a CCD sensor, a direct digital detector which directly converts X-rays into digital signals. The detector 13 illustrated in FIG. 1 is planar and defines a planar image surface, other geometries may of course be suitable.

The control unit 6 allows the acquisition to be controlled by setting several parameters, such as the radiation dose, to be emitted by the X-ray source and the positioning of the source 11 and of the detector 13. It is connected to the arm 15 through a wire or wireless connection.

The control unit 6 may comprise a reading device (not shown) for example a diskette reader, a CDROM, DVDROM reader or connection ports, in order to read the instructions of the processing method from a medium of instructions (not shown), such as a diskette, a CDROM, DVDROM, or USB key or, more generally, from any removable memory medium, or further via a network connection.

The storage unit 7 is connected to the control unit 6, for recording the parameters and the acquired images. Provision may be made for locating the storage unit 7 inside or outside the control unit 6. The storage unit 7 may be formed by a hard disk or SSD, or any other removable and rewritable storage means (USB keys, memory cards etc.). The storage unit 7 may be a ROM/RAM memory of the control unit 6, a USB key, a memory card, a memory of a central server.

The display unit 8 is connected to the control unit 6, for displaying the acquired images and/or information on the control parameters of the acquisition. The display unit 8 may for example be a computer screen, a monitor, a flatscreen, a plasma screen or any other type of display unit of a known type. Such a display unit 8 allows the practitioner to monitor reconstruction and/or display of the acquired 2D images.

The medical imaging system 100 is coupled with a processing system 200. The processing system 200 comprises a computation unit 9 and a storage unit 10. The processing system 200 receives the acquired images stored in the storage unit 4 of the medical imaging system 100, from which it carries out a certain number of processing operations (see hereafter) for example, a reconstruction of a 3D image from 2D images.

The transmission of the data from the storage unit 4 of the medical imaging system 100 to the computation unit 9 of the processing system 200 may be accomplished through an internal or external computer network or with any adequate physical memory medium such as diskettes, CDROMs, DVDROMs, external hard disk, USB key, SD card, etc. The computation unit 9 is for example, computer(s), microcontroller(s), microcomputer(s), programmable automaton or automata, application-specific integrated circuits, other programmable circuits, or other devices which include a computer, such as a workstation.

Alternatively, the computation unit 9 may comprise a reading device (not shown), for example, a diskette reader, a CDROM or DVDROM reader or connection ports for reading the instructions of the processing method from an instruction medium (not shown), such as a diskette, a CDROM, a DVDROM or a USB key, or more generally from any removable memory medium, or further via a network connection.

Further, the processing system 200 comprises a storage unit 14 for storing data generated by the computation unit 9. The computation unit 9 may be connected to the display unit 8 (as in FIG. 1) or else to another display unit (not shown).

The image processing method is for example, implemented in the processing unit 200 of the medical imaging system illustrated in FIG. 1. The image processing method allows reconstruction of a 3D image of an object of interest f from acquired 2D projection images p of the object of interest, in particular in the case when a contrast product has been injected into the object of interest.

A plurality of the 2D projection images obtained by means of the medical imaging system, the source of which moves along a trajectory around the object (commonly a rotation, also called spin), are therefore available.

The 2D projection images p are for example, acquired and recovered beforehand from the storage unit 14 of the processing unit 200 of the medical imaging system 100 and the processing of the 2D projection images is applied in the computer 9 of the processing unit 200 of the medical imaging system.

The 2D projection images p are such that Rf=p, wherein R is the projection operator which models the finished sampling carried out by the medical imaging system during the acquisition.

The reconstructed 3D images are affected by striations due to sub-sampling of the object of interest. It is known that sub-sampling may be compensated by a mathematical a priori according to which the object of interest is sparse; i.e. compressible. In the vascular case, these are the vessels of the object of interest. These vessels are revealed by injecting a contrast product. The passage time of this contrast product does not allow acquisition of a sufficient number of projections and in certain cases, even if the acquisition covers 180°, the angular coverage for which the contrast product is present is less than 180°, because of poor synchronization between the injection of the product, its diffusion and the acquisition of the images.

Typically, the distribution of the vessels injected into an organ has a support limited to a rather low fraction of the 3D image of the organ. It is therefore sparse. On the other hand, the sparsity assumption cannot be as strong for the remainder of the contents of the image (bones, soft tissues).

The acquisition therefore has to be accomplished by subtraction: two identical spins are acquired, one without contrast product injection, the other one with injection, so that the subtraction of both spins only corresponds to the vessels which are sparse. The integration of the acquired 2D projection images and of the compressibility assumption is accomplished by the definition of the functional:

$$J(g,\lambda)=\lambda S(g)+Q(g),$$

wherein Q is a quadratic tomographic reconstruction criterion, as for example, as described or referenced in documents [Riddell C, Savi A, Gilardi M C, Fazio F, *"Frequency weighted least squares reconstruction of truncated transmission SPECT data."* IEEE Trans. Nucl. Sci. 43(4):2292-8] and [Thibault J B, Sauer K D, Bouman C A, Hsieh J, *"A three-dimensional statistical approach to improved image quality for multi-slice helical CT"* Med. Phys.3(11):4526-44]. And wherein S is a sparsity constraint defined by:

$$S(g)=\|\Phi_{xyz}g\|_1$$

wherein $\| \|_1$ symbolizes the so-called $L_1$ norm and $\Phi_{xyz}$ is a transform allowing spatial compression of the 3D image g (wavelet transform, gradient, identity . . . ). More generally S may be the weighted sum of several of these spatial transforms and may combine other a priori known pieces of information on the image, such as the positivity of the X-ray attenuation coefficients. The scalar $\lambda$ is a weight, which defines the sparsity constraint force, in other words, the degree of compressibility of the sought solution.

As known for minimizing the functional $J(g,\lambda)$ with respect to g for fixed $\lambda$ and obtaining an estimation of f, solution of the perfectly sampled tomographic reconstruction problem, a convex optimization iterative algorithm may be used for minimization of $J(g,\lambda)$, for example one of those described or referenced in [Afonso M V, Bioucas-Dias J M, Figueirido M A, *"Fast image recovery using variable splitting and constrained optimization."* IEEE Trans. Image Process. (9):2345-56] and [Beck A, Teboulle M. *"Fast gradient-based algorithms for constrained total variation image denoising and deblurring problems."* IEEE Trans. Image Process. P. 18(11):2419-34].

The iteration allowing minimization of $J(g,\lambda)$ with respect to g for fixed $\lambda$ is noted as $A_\lambda$ and the 3D image resulting from the application of $\kappa$ iteration(s) of the algorithm initiated from the 3D image g is noted as $A_\lambda^\kappa[g]$. Indeed, except in the perfectly sampled case, it will be noted that these algorithms produce different images depending on the image g, from which the iterative optimization method is initiated.

For example, it is recalled that the minimization of $J(g,\lambda)$ is obtained by:

$$g^{(\kappa+1)}=A_\lambda[g^\kappa]=prox_{\rho\lambda}S(g^\kappa-\rho\nabla Q(g^\kappa)),$$

with $\rho$ a scalar assumed to be sufficiently small in order to guarantee convergence of $A_\lambda^\kappa$, $\nabla Q(g)$ being the gradient of Q at g, and $$prox_\gamma S(g) = arg_h \min\left\{\frac{1}{2}\|g-h\|^2 + \gamma S(h)\right\}$$

is the application of the proximal operator of S to g for $\gamma=\rho\lambda$ a scalar.

Applying a similar step for $A_\lambda$ may be contemplated by calculating $A_\lambda(g^{(\kappa)})$, not only from the iteration $g^{(\kappa)}$ but also from the iteration $g^{(\kappa-1)}$ or else further from all of the previous iterations.

By using either one of these algorithms, the sparsity constraint is applied on the totality of the object of interest.

In a novel way, these same algorithms are considered to be applicable in the case when the object of interest does not meet the sparsity constraint (impossible subtraction in the vascular case); an approximate (in particular biased) reconstruction of the sparse portions is then obtained at the cost of an extreme simplification or of a total loss of the other structures.

Such a reconstruction will be described as "selective" subsequently in this document since it selectively gives access to one or several sparse structures of the object of interest independently of the other ones. This selection is modulated by the intensity of the parameter $\lambda$. For a high value of $\lambda$, a very restricted set of structures is selected, for a very low or zero value, the reconstruction differs little or does not differ from a standard quadratic reconstruction, including all the structures, even those which are not sparse, and all the sub-sampling artefacts.

The originality of the embodiments the invention comes from the fact that only isolated structures of the object of interest are considered as sparse. Thus, always valid assumptions are made that a sparse image of the object of interest is known a priori (knowledge which may be zero), an assumption noted as H1, and that the object may be modelled a priori in a first sparse component, including the a priori known portion and in a second complementary and non-sparse component, called a "background" assumption noted as H2.

A selective reconstruction of the sparse portion is carried out by one of the aforementioned algorithms, initiated from the a priori known sparse image. This principle is however generalized by proceeding recursively per level: at each level, the sparse image is redefined as being equal to the sparse portion calculated at the previous level (assumption H1), and then the a priori model of the object is redefined by "enlarging" the sparse component (in other words, the intensity of the parameter $\lambda$ is reduced), assumption H2.

The recursion is, for example, initiated by a zero sparse 3D image (zero assumption H1) and ends for zero intensity $\lambda$ (assumption H2 where the so-called sparse component includes the whole object, although it is not sparse, and the complementary background component is zero).

The benefit of the method is to suppress the striations associated with the sparse component by the sparsity constraint, before reconstructing the background and avoiding degradation of the background by the striations. The striations, vessels in the vascular case, microcalcifications in the case of the breast tomosynthesis, are reduced or suppressed from the background. The recursion is therefore defined as a series of a priori models, defining at each level a sparse component and an complementary non-sparse component, which is simply expressed as a decreasing series of compressibility degrees $\Lambda=\{\lambda_1, \ldots, \lambda_\Xi\}$ such that $\lambda_1 > \ldots > \lambda_\Xi \geq 0$, for which, from the a priori sparse image $g_0$, possibly zero, an estimation $g^*(\Lambda,g_0)$ of a non-sparse solution f of the perfectly sampled tomographic reconstruction problem is determined according to:

$$\begin{cases} g_0, \Lambda = \{\lambda_1, \ldots, \lambda_\Xi\} \\ g(\lambda_1) = A_{\lambda_\xi}^\kappa[g_0] \\ g(\lambda_\xi) = A_{\lambda_\xi}^\kappa[g(\lambda_{\xi-1})] \quad \xi \in \{2, \ldots, \Xi\} \\ g^*(g_0, \Lambda) = g(\lambda_\Xi) \end{cases}$$

In order to explain the course of the method for obtaining $g^*(\Lambda,g_0)$, which is the complete reconstruction off the a priori image $g_0$ and $\Lambda$ the series of the models for breaking down the object, which is expressed as a sequence of compressibility degrees, are set ($E_1$). The sparse 3D image $g_p=g_o$ and the model for breaking down the object are initiated ($E_2$), by setting $\lambda=\lambda_\Xi$. The selective reconstruction is calculated ($E_3$) $g(\lambda)=A_{\lambda_\xi}{}^\kappa[g_p]$, which is the sequence of $\kappa$ iterations, which minimizes the functional $J(g,\lambda)$ with respect to g, for $\lambda=\lambda_1$ by starting with the sparse image $g_p$. Next, iteratively, at iteration $\xi \in \{2,\ldots,\Xi\}$, the sparse image $g_p=g(\lambda_{\xi-1})$ and the parameter of the decomposition model $\lambda=\lambda_\xi$ are updated ($E_4$) in order to return to step $E_3$. Thus, for $\tau=\Xi$, the complete reconstruction $g^*(\Lambda,g_0)=g(\lambda_\Xi)$ of the non-sparse object is obtained ($E_5$).

The method according to embodiments of the invention therefore consists of applying a succession of iterative 3D reconstructions which are less and less selective, from the set of acquired 2D projection images, but initiated by a sparse 3D image containing more and more structures, possibly reconstructed without any sub-sampling artefacts, so that the eliminated structure(s) are gradually reintroduced into the selective 3D reconstruction image in order to obtain a complete 3D image of the object of interest, estimated from the perfectly sampled object of interest.

It will be noted that the method, advantageously, neither makes any assumption on the acquired 2D projections nor requires any pre-processing specific to the method for these images. Only pre-processing operations which are customary for any tomographic reconstruction method for X-ray images are required.

Preferably, the following operators and constraints are used:

$$\nabla Q(g)=\tilde{R}(Rg-p)$$

wherein $\tilde{R}$ is an operator which models the filtered back-projection; the sparsity constraint combines $\Phi_{xyz}(g)=g$ with a positivity constraint so that the proximal operator $\text{prox}_\gamma S(g)$ is a threshold operator $\gamma$ for soft subtraction from the background of a 3D image, noted as $B_\gamma(g)$. This operator consists of:

setting to zero the pixels of the image for which the value is below the threshold, subtracting $\gamma$ from the pixels for which the value is above the threshold $\gamma$.

More generally, any segmentation operator by thresholding of a 3D image may be used, which:

sets to zero the pixels of the image having an intensity below a set threshold;

and/or reduces the intensity of pixels of the image by the value of a threshold;

and/or sets to zero, pixels of the image located outside a set area.

According to a particular embodiment, the processing method according to the invention consists in the following recursion:

$$\begin{cases} g_0, & \lambda_\xi=\tau(\Xi-\xi)/(\Xi-1) \quad \xi \in \{1,\ldots,\Xi\} \quad \rho>0 \\ g(\lambda_1)=B_{\rho\tau}(\rho\tilde{R}p) \\ g(\lambda_\xi)=B_{\rho\lambda_\xi}(g(\lambda_{\xi-1})-\rho\tilde{R}(Rg(\lambda_{\xi-1})-p)) \end{cases}$$

wherein $\tau$ is a constant defining a pixel level intensity, for example 90% of the maximum intensity of the result of the filtered back-projection $\tilde{R}p$.

In this particular embodiment, the first iteration $\xi=1$ leads to a step for filtered back-projection of the acquired 2D projection images. The result of this step is subject to a segmentation step by soft subtraction giving an image in which the background has been suppressed, the threshold of the subtraction corresponding to the weight of the given constraint.

Here the constraint is a sparsity constraint, which consists of considering that in the image, the structures having an intensity level above a threshold $\tau$ are sparse, the other ones not being sparse. This sparsity constraint is released in the following iterations $\xi \in \{2,\ldots,\Xi\}$ so as to reintroduce the eliminated areas, the threshold $\tau$ being replaced with a gradually linearly decreasing threshold during the iterations, i.e. the areas which have an intensity above an increasingly lower threshold are selected at each iteration.

The fact of having selected in a first phase, the images having the strongest intensities, causes reconstruction of these areas without the associated striations by the sparsity constraint, which then allows the reintroduction of the previously eliminated areas without reintroducing the striations associated with the strongest intensities.

Alternatively, the decrease of the threshold may follow a decreasing piecewise constant function.

The applications described above within the scope of injecting a contrast product into vessels are transposed without any modification into the case of breast tomosynthesis. Microcalcifications are sparse structures of very high intensity which may generate striations degrading the non-sparse structures of the background consisting of glandular and adipous tissues.

On the other hand, in the particular case where a lack of injection of the contrast product leads to having a set of components of the 2D projection images, such that some of them are without any contrast product, the complementary steps are introduced, consisting of:

AA) partitioning ($E_0$) of the components of the 2D projection images acquired in a subset of components without any contrast product, steps $E_1$ to $E_5$ being applied in order to process the subset of components with a contrast product and to obtain a complete 3D image of the object with a contrast product;

BB) reconstructing ($E_6$) by filtered back-projection the subset of components without any contrast products and obtaining a 3D image of the object of interest without any contrast product;

CC) determining ($E_7$) a 3D image, a weighted average of the 2D/3D image of the object with a contrast product obtained in step AA) ($E_0$-$E_5$) and of the 3D image of the object without any contrast product obtained in step BB) ($E_6$);

DD) iteratively reconstructing ($E_8$) the subset of components with a contrast product from the 3D composite image obtained in step CC) ($E_7$) so as to obtain an improved complete 3D image of the object with a contrast product.

The description which follows is made in the case of 3D reconstruction, i.e. from 2D projections. Of course, this description extends to the case of a 2D reconstruction, i.e. from 1D projections.

The method described above may be implemented as a computer program comprising machine instructions for applying the method.

What is claimed is:

1. A method for processing a sequence of a plurality of 1D or 2D projection images of an object of interest, wherein the projection images of the object of interest are acquired by a medical imaging system comprising a source of rays, the source being configured to move around the object in order to acquire the plurality of 1D or 2D projection images of the object of interest according to a plurality of angulations, the number of 1D or 2D projections and/or the angular coverage leading to the occurrence of specific sub-sampling artefacts, the method being recursive and comprising:

defining, a priori, a sparse image and a series of models for breaking down the object of interest as a sum of a sparse component and of a complementary non-sparse component;

initializing a sparse 2D or 3D image depending on the sparse image defined a priori and initializing the series of models for breaking down the object of interest;

reconstructing a 2D or 3D image of the sparse component of a decomposition model of the object of interest from acquired 1D or 2D projection images and from the initialized sparse 2D or 3D image; and updating the sparse 2D or 3D image as being equal to the reconstruction of the 2D or 3D image of the sparse component and updating the decomposition model of the object of interest into a new sparse component and a new complementary non-sparse component, and returning to reconstruction of the 2D or 3D image of the sparse component so that, during the iterations, the reconstruction of the 2D or 3D image of the sparse component gradually reintroduces the complementary component into the sparse 2D or 3D image, in order to obtain a complete 2D or 3D image of the non-sparse object of interest.

2. The method according to claim 1, wherein the reconstruction of the 2D or 3D image of the sparse component comprises applying to the acquired 1D or 2D projection images a reconstruction assuming that the object of interest is sparse.

3. The method according to claim 1, wherein defining a sparse image and a series of models for breaking down the object of interest comprises breaking down the object of interest according to the intensities of pixels relatively to a threshold such that if the intensity of the pixel is above the threshold, the pixel belongs to the sparse component, and if the intensity of the pixel is below the threshold, the pixel belongs to the complementary component.

4. The method according to claim 1, wherein defining a sparse image and a series of models for breaking down the object of interest comprises breaking down the object of interest according to a localization of the pixel in the 2D or 3D image depending on whether its index belongs to a set of indexes of the sparse component or to a set of indexes of the complementary component.

5. The method according to claim 1, wherein reconstructing the 2D or 3D image of the sparse component comprises a segmentation, the segmentation comprising at least one of:
  setting to zero the pixels of the image with an intensity less than a given threshold;
  reducing the intensities of the pixels of the image by the value of a threshold;
  setting to zero the pixels of the image for which the indexes belong to a set of given indexes.

6. The method according to claim 1, wherein reconstructing the 2D or 3D image of the sparse component comprises filtered back-projection.

7. The method according to claim 6, comprising the following recursion:

$$\begin{cases} g_0, \ \lambda_\xi = \tau(\Xi-\xi)/(\Xi-1) \quad \xi \in \{1,\ldots,\Xi\} \quad \rho > 0 \\ g(\lambda_1) = B_{\rho\tau}(g_0 - \rho\tilde{R}(Rg_0 - p)) \\ g(\lambda_\xi) = B_{\rho\lambda_\xi}(g(\lambda_{\xi-1}) - \rho\tilde{R}(Rg(\lambda_{\xi-1}) - p)) \quad \xi \in \{2,\ldots,\Xi\} \end{cases}$$

wherein $g_0$ is an image of the object of interest known a priori, $\lambda_\xi$ belongs to a sequence which is set a priori, of $\Xi$ thresholds linearly decreasing from $\tau$ to $0$, $p$ is the vector of the acquired 1D or 2D projections, $R$ is a projection operator which models the acquisition of the projection images, $\tilde{R}$ is an operator modelling the filtered back-projection, $\rho$ is a scalar guaranteeing conversion of the method and $B_\gamma$ is a segmentation thresholding operator with a threshold $\gamma$.

8. The method according to claim 7, wherein $\lambda_\xi$ belongs to a series of $\Xi$ thresholds decreasing from $\tau$ to $0$ according to a piecewise constant function so that each threshold remains unchanged for a predetermined number of iterations.

9. The method according to claim 1, wherein the a priori image of the object of interest is zero.

10. The method according to claim 1, wherein the acquired 1D or 2D projection images comprise a subset of components without any contrast product and a subset of components with a contrast product, wherein defining a sparse image and a series of models for breaking down the object of interest, initializing a sparse 2D or 3D image, reconstructing the 2D or 3D image of the sparse component and updating the sparse 2D or 3D image are applied for processing the subset of components with a contrast product; and wherein the method further comprises:
  reconstructing by filtered back-projection the subset of components without any contrast product and obtaining a 2D or 3D image of the object of interest without any contrast product;
  determining a 2D or 3D image, a weighted average of the 2D or 3D image of the object with a contrast product and of the 2D or 3D image of the object without any contrast product obtained by reconstructing by filtered back-projection the subset of components without any contrast product;
  iteratively reconstructing the subset of components with a contrast product from the 2D or 3D composite image obtained by determining a 2D or 3D image so as to obtain an improved complete 2D or 3D image of the object with a contrast product.

11. A medical imaging system comprising:
an acquisition unit configured to acquire a plurality of 1D or 2D projection images of an object of interest, the acquisition unit comprising a source of radiation and a sensor; and
a processor configured to:
  define, a priori, a sparse image and a series of models for breaking down the object of interest as a sum of a sparse component and of a complementary non-sparse component;
  initialize a sparse 2D or 3D image depending on the sparse image defined a priori and initializing the series of models for breaking down the object of interest;
  reconstruct a 2D or 3D image of the sparse component of a decomposition model of the object of interest from acquired 1D or 2D projection images and from the initialized sparse 2D or 3D image; and
  update the sparse 2D or 3D image as being equal to the reconstruction of the 2D or 3D image of the sparse component and updating the decomposition model of the object of interest into a new sparse component and a new complementary non-sparse component, and returning to reconstruction of the 2D or 3D image of the sparse component so that, during the iterations, the reconstruction of the 2D or 3D image of the sparse component gradually reintroduces the complementary component into the sparse 2D or 3D image, in order to obtain a complete 2D or 3D image of the non-sparse object of interest.

\* \* \* \* \*

UNITED STATES PATENT AND TRADEMARK OFFICE
CERTIFICATE OF CORRECTION

PATENT NO. : 8,644,573 B2  Page 1 of 1
APPLICATION NO. : 13/414748
DATED : February 4, 2014
INVENTOR(S) : Riddell It is certified that error appears in the above-identified patent and that said Letters Patent is hereby corrected as shown below:

In the Specification

In Column 6, Line 64, delete "g*(A,g$_0$)," and insert -- g*($\Lambda$,g$_0$), --, therefor.

In Column 6, Line 64, delete "off the" and insert -- of f, the --, therefor.

In Column 7, Line 2, delete " $\lambda = \lambda_\Xi$. " and insert -- $\lambda = \lambda_l$. --, therefor.

In Column 7, Line 8, delete " $\tau = \Xi$. " and insert -- $\xi = \Xi$. --, therefor.

In Column 7, Line 55, delete " $g(\lambda_1) = B_{\rho;}(\rho \widetilde{R} p))$ " and insert -- $g(\lambda_1) = B_{\rho;}(\rho \widetilde{R} p)$ --, therefor.

Signed and Sealed this
Twentieth Day of May, 2014

Michelle K. Lee
*Deputy Director of the United States Patent and Trademark Office*